(12) United States Patent
Furuichi et al.

(10) Patent No.: US 10,063,518 B2
(45) Date of Patent: Aug. 28, 2018

(54) REDUCING DATA CONNECTIONS FOR TRANSMITTING SECURED DATA

(71) Applicant: INTERNATIONAL BUSINESS MACHINES CORPORATION, Armonk, NY (US)

(72) Inventors: Sanehiro Furuichi, Tokyo (JP); Masami Tada, Sagamihara (JP); Takahito Tashiro, Mitaka (JP)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/276,845

(22) Filed: Sep. 27, 2016

(65) Prior Publication Data

US 2018/0091475 A1    Mar. 29, 2018

(51) Int. Cl.
*H04L 29/06* (2006.01)
*G06F 21/60* (2013.01)
(Continued)

(52) U.S. Cl.
CPC .......... *H04L 63/0245* (2013.01); *G06F 21/33* (2013.01); *G06F 21/44* (2013.01);
(Continued)

(58) Field of Classification Search
CPC . G06F 21/60; G06F 19/34; H04L 9/32; H04L 63/00

See application file for complete search history.

(56) References Cited

U.S. PATENT DOCUMENTS 7,716,243 B2 * 5/2010 Schwartz .............. G06F 21/645
707/694
9,361,465 B2    6/2016 Lortz et al.
(Continued)

OTHER PUBLICATIONS

Mell et al., "The NIST Definition of Cloud Computing," National Institute of Standards and Technology, Sep. 2011, pp. 1-3, Special Publication 800-145.

(Continued)

*Primary Examiner* — Wasika Nipa
(74) *Attorney, Agent, or Firm* — Erik K. Johnson; Reza Sarbakhsh

(57) ABSTRACT

A method for reducing data transfer connections is provided. The method may include receiving data requests associated with devices. The method may further include collecting data associated with the devices based on the data requests. Additionally, the method may include identifying applications for receiving the collected data. The method may also include generating datasets based on the collected data and the identified applications, wherein the datasets include collected data that is combined based on a commonality for transmission to one or more common applications. The method may further include generating passwords for the datasets. The method may also include encrypting the passwords. The method may further include generating data blocks, including a dataset, the generated and encrypted passwords, and UUIDs for each application. The method may also include transmitting the data blocks to the identified applications. The method may further include receiving and transmitting data responses from the applications.

11 Claims, 6 Drawing Sheets

(51) Int. Cl.
*G06F 21/45* (2013.01)
*G06F 21/44* (2013.01)
*G06F 21/33* (2013.01)

(52) U.S. Cl.
CPC ............ *G06F 21/45* (2013.01); *G06F 21/602* (2013.01); *H04L 63/0281* (2013.01); *H04L 63/0442* (2013.01); *H04L 63/061* (2013.01); *H04L 63/083* (2013.01); *H04L 63/0823* (2013.01); *H04L 63/0846* (2013.01)

(56) References Cited

U.S. PATENT DOCUMENTS

| | | | |
|---|---|---|---|
| 2014/0223575 A1 | 8/2014 | Nandi et al. | |
| 2014/0289366 A1* | 9/2014 | Choi | G06F 9/4451 709/218 |
| 2016/0205078 A1* | 7/2016 | James | H04L 63/0442 713/171 |
| 2016/0205106 A1* | 7/2016 | Yacoub | H04L 61/1511 726/28 |
| 2017/0094033 A1 | 3/2017 | Sathyadevan et al. | |
| 2017/0201585 A1* | 7/2017 | Doraiswamy | H04L 41/0806 |

OTHER PUBLICATIONS

Wikipedia, "MQTT," Wikipedia: the Free Encyclopedia, Last Modified on Aug. 30, 2016, pp. 1-3, https://en.wikipedia.org/wiki/MQTT, Accessed on Sep. 16, 2016.

IBM: List of IBM Patents or Patent Applications Treated as Related (Appendix P), Dec. 4, 2017, pp. 1-2.

Furuichi et al., U.S. Appl. No. 15/830,243, filed Dec. 4, 2017, titled "Reducing Data Connections for Transmitting Secured Data," pp. 1-34.

* cited by examiner

REDUCING DATA CONNECTIONS FOR TRANSMITTING SECURED DATA

BACKGROUND

The present invention relates generally to the field of computing, and more specifically, to data security and privacy.

Generally, the internet of things (IoT) may include a network of computer devices, vehicles, buildings, other objects and items that are embedded with electronics, software, sensors, actuators, and network connectivity to enable these objects to communicate as well as collect and exchange data. For example, the IoT can assist in integrating communications, control, and information processing associated with transportation systems, whereby different applications associated with the IoT may interact with a transportation system that may include a vehicle, the vehicle infrastructure and location, and driver/user information. Specifically, for example, advancements in IoT techniques have enabled vehicles to collect road obstacle information and weather/environmental information on a server, whereby the collected information may be analyzed and processed by applications on the server side, and the analyzed results may be provided to the vehicles and drivers. As a result, such dynamic communication between components of transportation systems have enabled vehicular communication, smart traffic control, smart parking, electronic toll collection systems, logistic and fleet management, vehicle control, and safety and roadside assistance.

SUMMARY

A method for reducing a plurality of data transfer connections associated with a plurality of devices and a plurality of applications is provided. The method may include receiving a plurality of data requests associated with the plurality of devices. The method may further include collecting a plurality of data associated with the plurality of devices based on the received plurality of data requests. Additionally, the method may include identifying the plurality of applications for receiving the collected plurality of data based on the received plurality of data requests. The method may also include generating a plurality of datasets based on the collected plurality of data and the identified plurality of applications, wherein each generated dataset associated with the generated plurality of datasets includes data associated with the collected plurality of data that is combined based on a commonality for transmission to one or more common applications associated with the plurality of applications. The method may further include generating at least one password for each of the generated datasets. The method may also include encrypting the generated at least one password for each of the generated datasets. The method may further include generating a plurality of data blocks, wherein each generated data block associated with the generated plurality of data blocks includes a dataset associated with the generated plurality of datasets, the generated and encrypted at least one password for the dataset, and a universally unique identifier (UUID) for each application associated with the identified plurality of applications. The method may also include transmitting the generated plurality of data blocks to the identified plurality of applications. The method may further include receiving and transmitting a plurality of data responses from the identified plurality of applications based on the transmitted plurality of data blocks.

A computer system for reducing a plurality of data transfer connections associated with a plurality of devices and a plurality of applications is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of data requests associated with the plurality of devices. The method may further include collecting a plurality of data associated with the plurality of devices based on the received plurality of data requests. Additionally, the method may include identifying the plurality of applications for receiving the collected plurality of data based on the received plurality of data requests. The method may also include generating a plurality of datasets based on the collected plurality of data and the identified plurality of applications, wherein each generated dataset associated with the generated plurality of datasets includes data associated with the collected plurality of data that is combined based on a commonality for transmission to one or more common applications associated with the plurality of applications. The method may further include generating at least one password for each of the generated datasets. The method may also include encrypting the generated at least one password for each of the generated datasets. The method may further include generating a plurality of data blocks, wherein each generated data block associated with the generated plurality of data blocks includes a dataset associated with the generated plurality of datasets, the generated and encrypted at least one password for the dataset, and a universally unique identifier (UUID) for each application associated with the identified plurality of applications. The method may also include transmitting the generated plurality of data blocks to the identified plurality of applications. The method may further include receiving and transmitting a plurality of data responses from the identified plurality of applications based on the transmitted plurality of data blocks.

A computer program product for reducing a plurality of data transfer connections associated with a plurality of devices and a plurality of applications is provided. The computer program product may include one or more computer-readable storage devices and program instructions stored on at least one of the one or more tangible storage devices, the program instructions executable by a processor. The computer program product may include program instructions to receive a plurality of data requests associated with the plurality of devices. The computer program product may further include program instructions to collect a plurality of data associated with the plurality of devices based on the received plurality of data requests. Additionally, the computer program product may also include program instructions to identify the plurality of applications for receiving the collected plurality of data based on the received plurality of data requests. The computer program product may further include program instructions to generate a plurality of datasets based on the collected plurality of data and the identified plurality of applications, wherein each generated dataset associated with the generated plurality of datasets includes data associated with the collected plurality of data that is combined based on a commonality for transmission to one or more common applications associated with the plurality of applications. The computer program product may also include program instructions to generate at least one password for each of the generated datasets. The computer program product may further include program instructions to encrypt the generated at least one password for each of the generated datasets. The computer program product may also include program instructions to generate a plurality of data blocks, wherein each generated data block associated with the generated plurality of data blocks includes a dataset associated with the generated plurality of datasets, the generated and encrypted at least one password for the dataset, and a universally unique identifier (UUID) for each application associated with the identified plurality of applications. The computer program product may further include program instructions to transmit the generated plurality of data blocks to the identified plurality of applications. The computer program product may also include program instructions to receive and transmit a plurality of data responses from the identified plurality of applications based on the transmitted plurality of data blocks.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
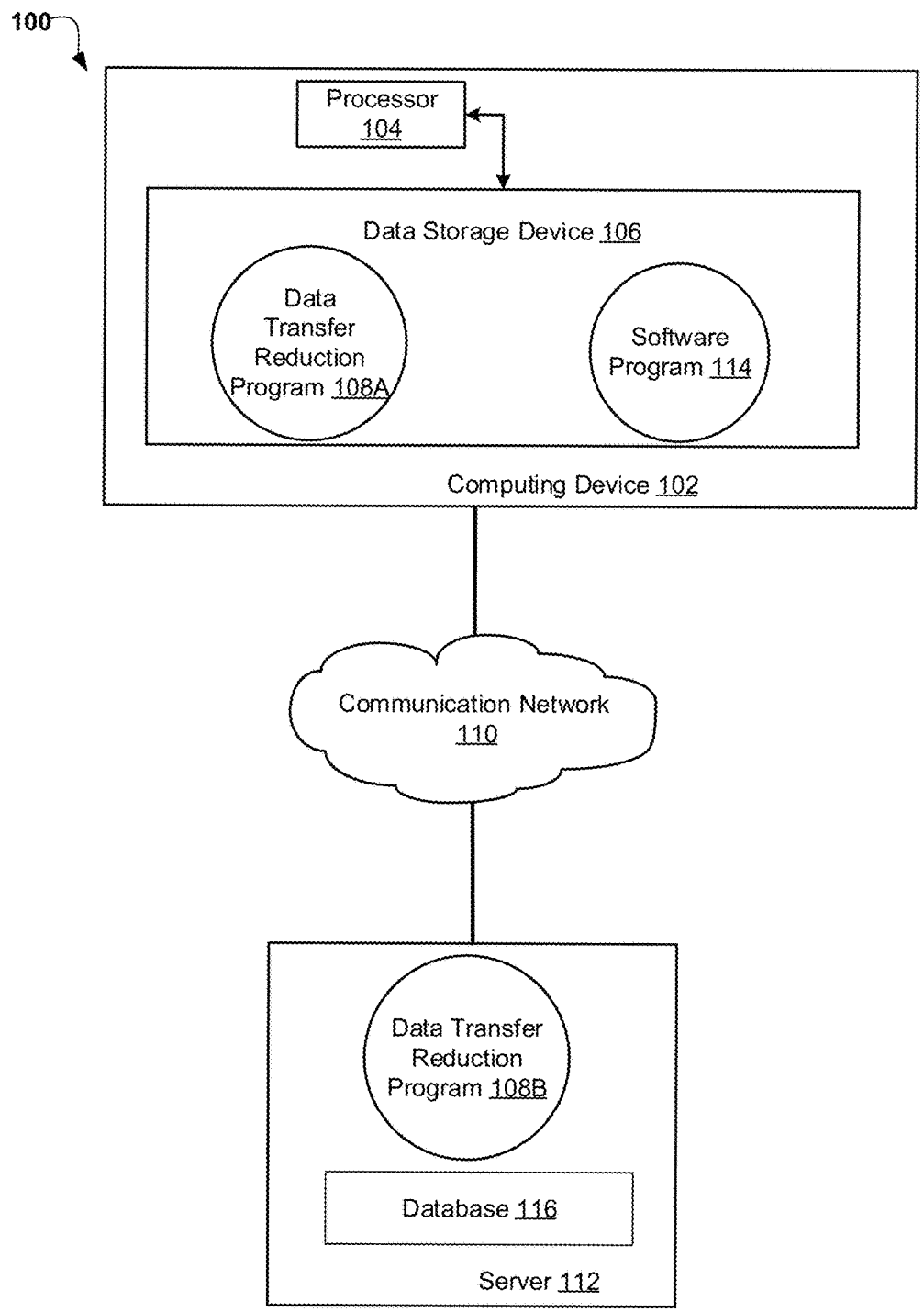
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data communications. The following described exemplary embodiments provide a system, method and program product for reducing data transfer connections. Therefore, the present embodiment has the capacity to improve the technical field associated with data communications by reducing data transfer connections needed to transmit similar/common data by avoiding generating individual data transfer connections between devices and applications to individually transfer similar information. Specifically, the present embodiment may group collected data associated with devices, and form data blocks that include the grouped data and a combination of encrypted passwords and unique identifiers, to securely and individually transmit the grouped data to applications that are authorized to receive the grouped data and prevent the applications that are unauthorized from receiving the grouped data.

As previously described, the IoT can assist in integrating communications, control, and information processing associated with systems. For example, in a transportation system, the IoT may enable vehicles to collect road obstacle information and weather/environmental information, analyze and process the information through different applications on a server, and send the analyzed results to the vehicles. However, like much data and information that is transferred over a network, security and privacy may be a concern. Specifically, users may not want their user information, such as personal data and/or location information, to be provided to unauthorized applications that may require the information to provide results. In such cases, secure connections may be established for each application that requires the users' information. However, establishing secure connections for each application increases communication fees. Furthermore, based on the secured connections for each application, the information required by the different applications are typically individually transmitted to each application, thereby increasing the secure data transfer connections. As such, it may be advantageous, among other things, to provide a system, method and program product for reducing data transfer connections by grouping and encrypting collected data based on destinations for the collected data. Specifically, the system, method, and program product may securely transmit data associated with devices by grouping collected data associated with devices, and forming data blocks that include the grouped data and a combination of encrypted passwords and unique identifiers, to securely and individually transmit the grouped data to applications that are authorized to receive the grouped data and prevent the applications that are unauthorized from receiving the grouped data.

According to at least one implementation of the present embodiment, data requests associated with devices may be received. Then, based on the received data requests, data associated with devices may be collected. Furthermore, destination applications for receiving the collected data may be identified. Next, based on the collected data and identified destination applications, datasets may be generated, wherein the generated datasets include common data associated with the collected data. Then, passwords may be generated for the generated datasets. Next, the generated passwords may be encrypted. Then, data blocks may be generated based on the generated datasets, the generated and encrypted passwords, and universally unique identifiers (UUIDs). Next, the generated data blocks may be transmitted to the destination applications. Then, based on the transmitted data blocks, data responses may be received and transmitted to the devices.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for reducing data transfer connections associated with devices and applications.

According to at least one implementation, data requests associated with devices may be received. Then, based on the received data requests, data associated with devices may be collected. Furthermore, destination applications for receiving the collected data may be identified. Next, based on the collected data and identified destination applications, datasets may be generated, wherein the generated datasets include common data associated with the collected data. Then, passwords may be generated for the generated datasets. Next, the generated passwords may be encrypted. Then, data blocks may be generated based on the generated datasets, the generated and encrypted passwords, and universally unique identifiers (UUIDs). Next, the generated data blocks may be transmitted to the destination applications. Then, based on the transmitted data blocks, data responses may be received and transmitted to the devices.

Referring now to FIG. 1, an exemplary networked computer environment 100 in accordance with one embodiment is depicted. The networked computer environment 100 may include a computer 102 with a processor 104 and a data storage device 106 that is enabled to run a data transfer reduction program 108A and a software program 114. The software program 114 may be an application program such as a television program, a web program, and an email program. The data transfer reduction program 108A may communicate with the software program 114. The networked computer environment 100 may also include a server 112 that is enabled to run a data transfer reduction program 108B and a communication network 110. The networked computer environment 100 may include a plurality of computing devices 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The computing device 102 may communicate with server computer 112 via the communications network 110. The communications network 110 may include connections, such as wire, wireless communication links, or fiber optic cables, as well as an edge gateway. As will be discussed with reference to FIG. 4, server computer 112 may include internal components 800a and external components 900a, respectively, and computing device 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Computing device 102 may be, for example, a mobile device, a set top box, a television device, a telephone, a personal digital assistant, a netbook, a laptop computer, a tablet computer, a desktop computer, an internet of things (IoT) device such as cars and appliances, or any type of computing device capable of running a program and accessing a network. According to various implementations of the present embodiment, the data transfer reduction program 108A, 108B may interact with a database 116 that may be embedded in various storage devices, such as, but not limited to a mobile device 102, a networked server 112, or a cloud storage service.

According to the present embodiment, a program, such as a data transfer reduction program 108A and 108B may run on the computing device 102 and/or on the server computer 112 and communicate via a communications network 110. The data transfer reduction program 108A, 108B may reduce data transfer connections by grouping and encrypting collected data based on destinations for the collected data. Specifically, devices 102 may run a data transfer reduction program 108A, 108B that may interact with servers 112 through a communication network 110, which may include an edge gateway, to group collected data associated with the devices 102, and form data blocks that include the grouped data and a combination of encrypted passwords and unique identifiers, to securely and individually transmit the grouped data to applications that are authorized to receive the grouped data and prevent the applications that are unauthorized from receiving the grouped data.

Figure 2:
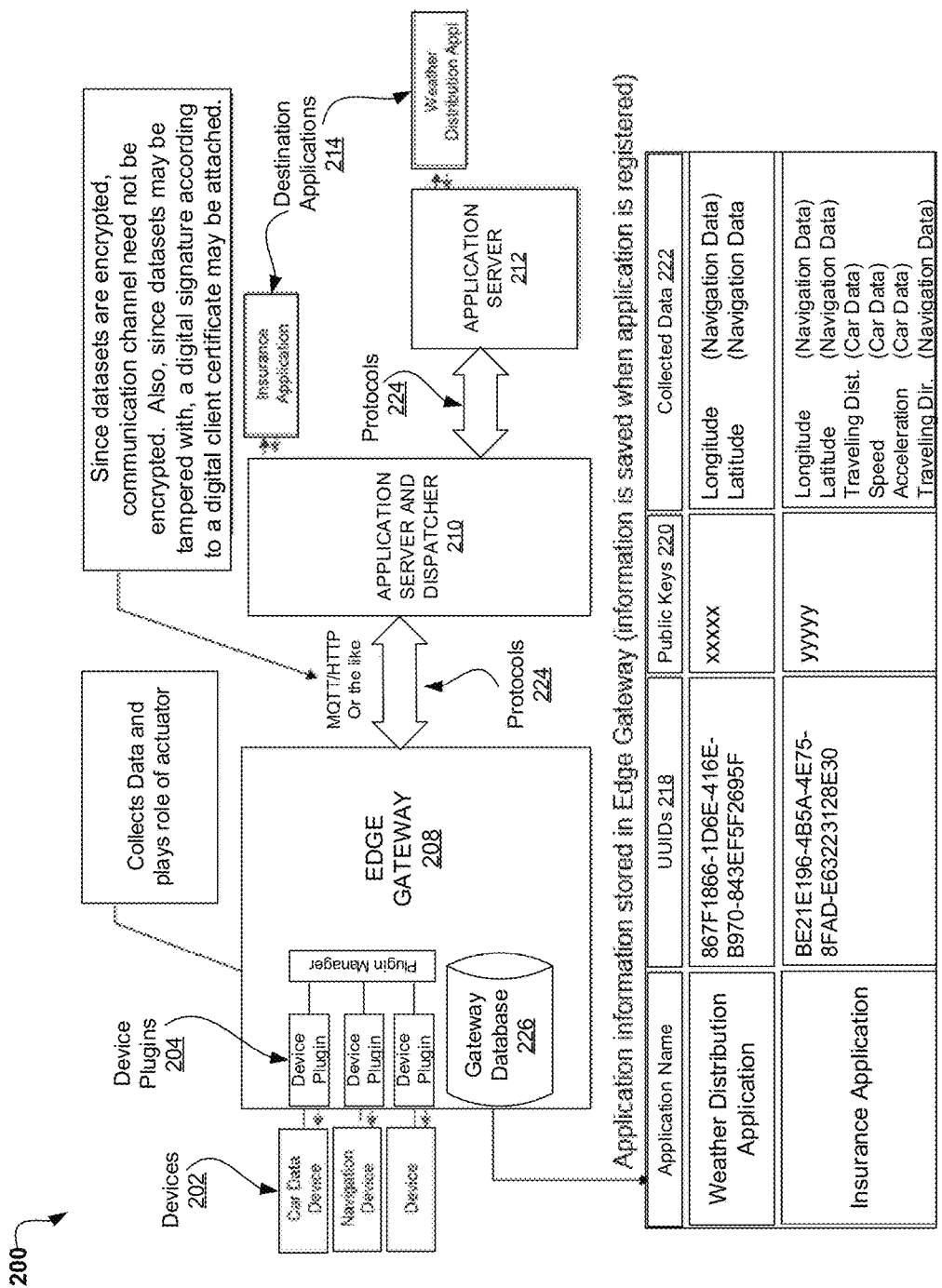
FIG. 2 is a block diagram illustrative of an example of a program for reducing data transfer connections associated with devices and applications according to one embodiment.

Referring now to FIG. 2, a block diagram 200 illustrating an example of a data transfer reduction program 108A, 108B (FIG. 1) for securely transmitting data and preventing unauthorized applications from receiving the securely transmitted data is depicted. Specifically, the data transfer reduction program 108A, 108B (FIG. 1) may receive data requests for information associated with devices 202, such as a car data device and a navigation device of an automobile. As such, using an edge gateway 208 and device plugins 204 that are associated with the edge gateway 208, the data transfer reduction program 108A, 108B (FIG. 1) may collect data 222 associated with the devices 202 based on the collected data requests. Furthermore, the data transfer reduction program 108A, 108B (FIG. 1) may use the edge gateway 208 to identify destination applications 214 that are authorized to securely receive the collected data 222. Specifically, the data transfer reduction program 108A, 108B (FIG. 1) may use the edge gateway 208 to communicate, via protocols 224 such as MQ telemetry transport (MQTT) and hypertext transport protocol (HTTP), with one or more servers, such as an application server and dispatcher 210 and an application server 212, and to identify applications registered with the application server and dispatcher 210 and the application server 212 that may serve as destinations and/or not serve as destinations for the collected data 222 based on the received data requests.

Then, based on the collected data 222 and the determined destination applications 214, the data transfer reduction program 108A, 108B (FIG. 1) may generate datasets for each destination application 214 that is authorized to receive the datasets. Thereafter, the data transfer reduction program 108A, 108B (FIG. 1) may generate one-time passwords for the generated datasets. Additionally, based on the generated datasets and the destination applications 214, the data transfer reduction program 108A, 108B (FIG. 1) may encrypt each of the generated one-time passwords with public keys 220 that are associated with the destination applications 214. Next, the data transfer reduction program 108A, 108B (FIG. 1) may generate data blocks that include the generated datasets with the collected data 222, the encrypted passwords, and universally unique identifiers (UUID) 218 that are associated with and may serve as maps to the destination applications 214. Then, the data transfer reduction program 108A, 108B (FIG. 1) may securely transmit the generated data blocks, to securely transmit the generated datasets associated with each data block, to the destination applications 214. Thereafter, the data transfer reduction program 108A, 108B (FIG. 1) may receive data responses from the destination applications 214 based on the securely transmitted data blocks. Furthermore, the data transfer reduction program 108A, 108B (FIG. 1) may group the collected data responses based on the devices and transmit the grouped data responses to the respective devices 202.

Figure 3:
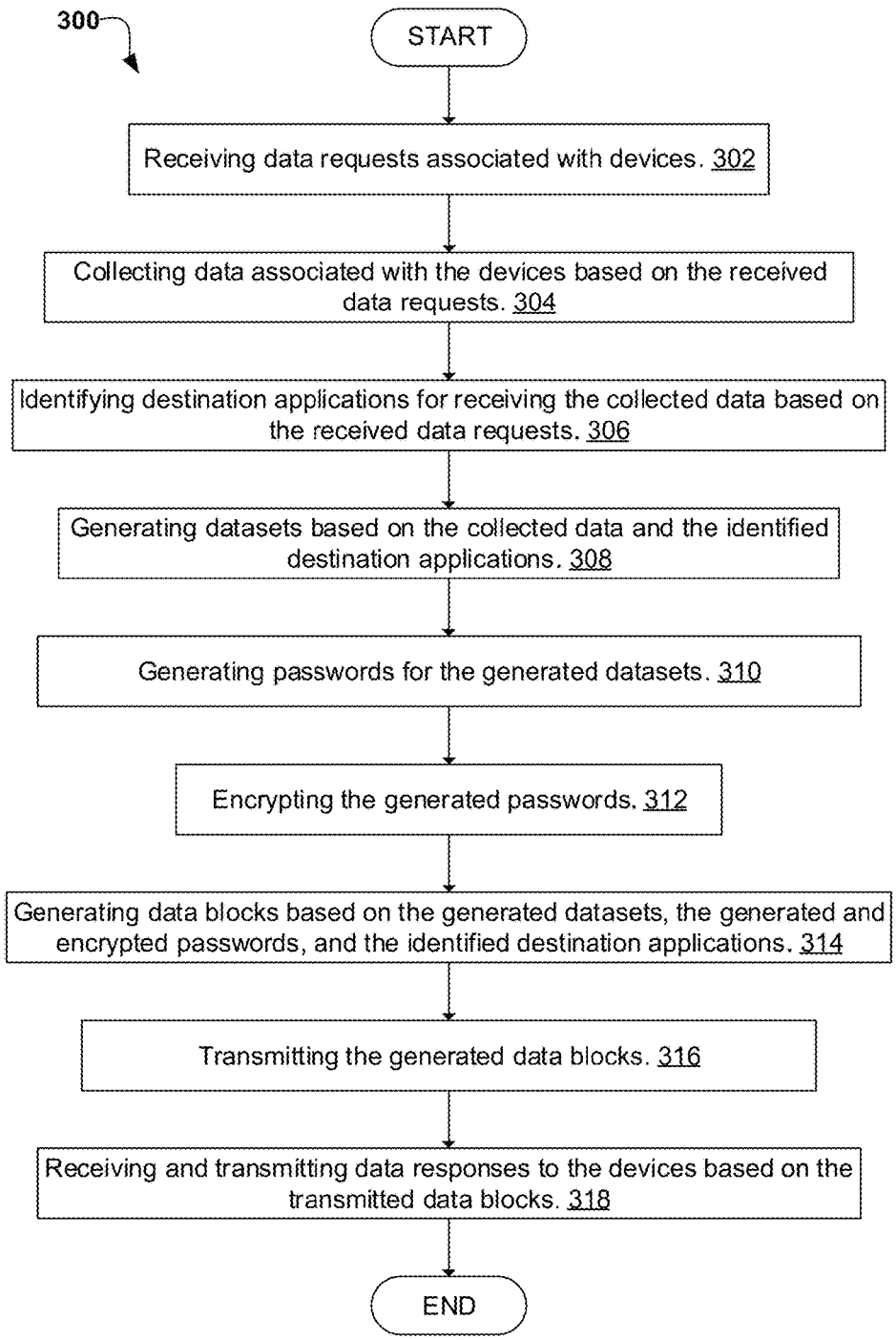
FIG. 3 is an operational flowchart illustrating the steps carried out by a program for reducing data transfer connections associated with devices and applications according to one embodiment.

Referring now to FIG. 3, an operational flowchart 300 illustrating the steps carried out by a program for reducing data transfer connections is depicted. At 302, the data transfer reduction program 108A, 108B (FIG. 1) may receive data requests associated with devices 202 (FIG. 2). For example, the data transfer reduction program 108A, 108B (FIG. 1) may receive a data request associated with a car data device 202 (FIG. 2) of an automobile requesting information about costs of insurance premiums based on traveling distances of the automobile and traveling conditions of the automobile. Furthermore, the data transfer reduction program 108A, 108B (FIG. 1) may receive a data request associated with a navigation device 202 (FIG. 2) of the automobile requesting information about weather conditions based on the location of the automobile.

Then, at 304, the data transfer reduction program 108A, 108B (FIG. 1) may collect data 222 (FIG. 2) associated with the devices 202 (FIG. 2) based on the received data requests. For example, and as previously described at step 302, the data transfer reduction program 108A, 108B (FIG. 1) may receive a data request associated with a car data device 202 (FIG. 2) of an automobile requesting information about costs of insurance premiums based on the traveling distances of an automobile and the traveling conditions of the automobile. As such, the data transfer reduction program 108A, 108B (FIG. 1) may collect the data 222 (FIG. 2) needed to satisfy the request, such as positional data that may include the longitude and latitude of the automobile, as well as travel data associated with the automobile, such as travel distance, speed, acceleration, and traveling direction. Furthermore, and as previously described, the data transfer reduction program 108A, 108B (FIG. 1) may receive a data request associated with a navigation device 202 (FIG. 2) of the automobile requesting information about weather conditions based on the location of the automobile. Therefore, the data transfer reduction program 108A, 108B (FIG. 1) may collect the data 222 (FIG. 2) needed to satisfy the request, whereby the collected data may include just the positional data, such as the longitude and latitude of the automobile.

Next, at 306, the data transfer reduction program 108A, 108B (FIG. 1) may identify destination applications 214 (FIG. 2) for receiving the collected data 222 (FIG. 2) based on the received data requests. Specifically, and as previously described in FIG. 2, the data transfer reduction program 108A, 108B (FIG. 1) may use the edge gateway 208 (FIG. 2) to determine the destination applications 214 (FIG. 2) that are authorized to securely receive the collected data 222 (FIG. 2). More specifically, the data transfer reduction program 108A, 108B (FIG. 1) may use the edge gateway 208 (FIG. 2) to communicate, via protocols 224 (FIG. 2) such as MQTT and HTTP, with one or more servers 112 (FIG. 1), such as an application server and dispatcher 210 (FIG. 2) and an application server 212 (FIG. 2), and to populate and identify applications registered with the application server and dispatcher 210 (FIG. 2) and the application server 212 (FIG. 2) that may serve as destinations and/or not serve as destinations for the collected data 222 (FIG. 2) based on the received data requests.

For example, and as previously described at steps 302 and 304, the data transfer reduction program 108A, 108B (FIG. 1) may collect data based on received data requests that may be associated with the insurance premium data request and the weather conditions data request. Thereafter, the data transfer reduction program 108A, 108B (FIG. 1) may use the edge gateway 208 (FIG. 2) to identify destination applications 214 (FIG. 2) by populating and identifying applications registered with the application server and dispatcher 210 (FIG. 2) and the application server 212 (FIG. 2) that may serve as destinations for the collected data 222 (FIG. 2) associated with the insurance premium data request and the weather conditions data request. Specifically, the data transfer reduction program 108A, 108B (FIG. 1) may identify destination applications 214 (FIG. 2) such as an insurance application that may be authorized to receive the collected data 222 (FIG. 2) based on the insurance premium data request, and a weather distribution application that may be authorized to receive the collected data 222 (FIG. 2) based on the weather conditions data request.

Then, at 308, the data transfer reduction program 108A, 108B (FIG. 1) may generate datasets based on the collected data 222 (FIG. 2) and the identified destination applications 214 (FIG. 2). Specifically, the data transfer reduction program 108A, 108B (FIG. 1) may generate datasets by separating and then combining the collected data 222 (FIG. 2) based on a commonality between data associated with the collected data 222 (FIG. 2), whereby the combined data based on the commonality may include like/common data associated with the collected data 222 (FIG. 2), and whereby the like/common data may be similar and/or identical collected data 222 (FIG. 2) that may be transmitted to a common identified destination application 214 (FIG. 2). For example, and as previously described at step 304, the data transfer reduction program 108A, 108B (FIG. 1) may collect data 222 (FIG. 2) such as the longitude and latitude of an automobile, travel distance, speed, acceleration, and traveling direction in response to the insurance premium data request. Also, the data transfer reduction program 108A, 108B (FIG. 1) may collect data 222 (FIG. 2) such as the longitude and latitude of the automobile in response to the weather conditions data request. Furthermore, the data transfer reduction program 108A, 108B (FIG. 1) may identify the insurance application and the weather distribution application as destination applications 214 (FIG. 2) for receiving the collected data 222 (FIG. 2) Therefore, the data transfer reduction program 108A, 108B (FIG. 1) may combine the longitude and latitude information that is similarly collected in response to both the insurance premium data request and the weather conditions data request. As such, the data transfer reduction program 108A, 108B (FIG. 1) may generate a dataset including the longitude and latitude data that may be transmitted to both the insurance application and the weather distribution application, and may generate a dataset that may include the travel distance, speed, acceleration, and traveling direction data that may be transmitted to just the insurance application.

Next, at 310, the data transfer reduction program 108A, 108B (FIG. 1) may generate passwords for the generated datasets. Specifically, and according to one embodiment, the data transfer reduction program 108A, 108B (FIG. 1) may generate one-time passwords for the generated datasets, whereby the generated one-time passwords may include an expiration date to enable using the one-time password on more than one occasion until the expiration date, as well as to omit having to generate the one-time password each time a dataset is generated. For example, the data transfer reduction program 108A, 108B (FIG. 1) may generate a one-time password for the generated dataset that includes the longitude and latitude data which may be transmitted to both the insurance application and the weather distribution application, and may generate a one-time password for the generated dataset that includes the travel distance, speed, acceleration, and traveling direction data which may be transmitted to just the insurance application.

Then, at 312, the data transfer reduction program 108A, 108B (FIG. 1) may encrypt the generated passwords associated with the generated datasets. Specifically, the data transfer reduction program 108A, 108B (FIG. 1) may encrypt the generated passwords using public keys 220 (FIG. 2) that correspond to the destination applications 214 (FIG. 2) that are associated with each of the generated datasets, whereby private keys that may be held by the destination applications 214 (FIG. 2) may be used to decrypt the encrypted passwords. For example, and as previously described at step 310, the data transfer reduction program 108A, 108B (FIG. 1) may generate a one-time password for the generated dataset that includes longitude and latitude data for both the insurance application and the weather distribution application. Therefore, the data transfer reduction program 108A, 108B (FIG. 1) may encrypt the generated password for the generated dataset that includes the longitude and latitude data using a public key 220 (FIG. 2) associated with the insurance application as well as encrypt the generated password using a public key 220 (FIG. 2) associated with the weather distribution application. Furthermore, and as previously described at step 310, the data transfer reduction program 108A, 108B (FIG. 1) may generate a one-time password for the generated dataset that includes travel distance, speed, acceleration, and traveling direction data for the insurance application. Therefore, the data transfer reduction program 108A, 108B (FIG. 1) may encrypt the generated password for the generated dataset that includes the travel distance, speed, acceleration, and traveling direction data using a public key 220 (FIG. 2) associated with just the insurance application.

Next, at 314, the data transfer reduction program 108A, 108B (FIG. 1) may generate data blocks that include the generated datasets, the generated and encrypted passwords, and the UUIDs 218 (FIG. 2) that are associated with the corresponding destination applications 214 (FIG. 2) for each of the generated datasets. For example, and as previously described in steps 304-312, the data transfer reduction program 108A, 108B (FIG. 1) may generate a dataset that may include longitude and latitude data that may be transmitted to both an insurance application and a weather distribution application. Furthermore, the data transfer reduction program 108A, 108B (FIG. 1) may generate and encrypt a password for the generated dataset that includes the longitude and latitude information. Therefore, for the longitude and latitude data that may be transmitted to both the insurance application and the weather distribution application, the data transfer reduction program 108A, 108B (FIG. 1) may generate a data block that includes the generated dataset with the longitude and latitude data, the encrypted password that includes the public key 220 (FIG. 2) associated with the insurance application, the encrypted password that includes the public key 220 (FIG. 2) associated with the weather distribution application, and the UUIDs 218 (FIG. 2) that identify and serve as maps to the insurance application and the weather distribution application.

Furthermore, for example, the data transfer reduction program 108A, 108B (FIG. 1) may generate a dataset that may include the travel distance, speed, acceleration, and traveling direction data that may be transmitted to just the insurance application. Then, the data transfer reduction program 108A, 108B (FIG. 1) may generate and encrypt a password for the generated dataset that includes the travel distance, speed, acceleration, and traveling direction data. Therefore, for the travel distance, speed, acceleration, and traveling direction data that may be transmitted to just the insurance application, the data transfer reduction program 108A, 108B (FIG. 1) may generate a data block that includes the generated dataset with the travel distance, speed, acceleration, and traveling direction data, the encrypted password that includes the public key 220 (FIG. 2) associated with the insurance application, and the UUID 218 (FIG. 2) that identifies and serves as a map to the insurance application. Also, according to one embodiment, the generated data blocks may include timestamps for when the data block was created, and/or timestamps after transmission of the data block to indicate when the data blocks are transmitted to the destination applications 214 (FIG. 2), as well as include digital certificates to exchange between the edge gateway 208 (FIG. 2) and the destination applications 214 (FIG. 2).

Then, at 316, the data transfer reduction program 108A, 108B (FIG. 1) may transmit the generated data blocks to the destination applications 214 (FIG. 2). Specifically, and as previously described in FIG. 2, the data transfer reduction program 108A, 108B (FIG. 1) may use the edge gateway 208 (FIG. 2) to communicate with the application server and dispatcher 210 (FIG. 2) and the application server 212 (FIG. 2) that include the destination applications 214 (FIG. 2), and to transmit the generated data blocks to the corresponding destination applications 214 (FIG. 2) based on the received data requests. For example, the data transfer reduction program 108A, 108B (FIG. 1) may transmit the longitude and latitude data to both the insurance application and the weather distribution application using the generated data block that includes the generated dataset with the longitude and latitude data, the encrypted password that includes the public key 220 (FIG. 2) associated with the insurance application, the encrypted password that includes the public key 220 (FIG. 2) associated with the weather distribution application, and the UUIDs 218 (FIG. 2), whereby private keys associated with the insurance application and weather distribution application may be used to decrypt the encrypted passwords and receive the longitude and latitude data.

Next, at 318, based on the transmitted data blocks, the data transfer reduction program 108A, 108B (FIG. 1) may receive data responses associated with the destination applications 214 (FIG. 2) and may transmit the received data responses to the devices 202 (FIG. 2). Specifically, the data transfer reduction program 108A, 108B (FIG. 1) may receive the data responses using the edge gateway 208 (FIG. 2) and may transmit the data responses to the devices 202 (FIG. 2) by processing the received data responses on the edge gateway 208 (FIG. 2) and transmitting the processed data responses to the devices 202 (FIG. 2). For example, and as previously described at step 316, the data transfer reduction program 108A, 108B (FIG. 1) may transmit a generated data block including longitude and latitude data to both an insurance application and a weather distribution application, and may transmit a generated data block including travel distance, speed, acceleration, and traveling direction data to an insurance application. Thereafter, based on the transmitted data blocks, the data transfer reduction program 108A, 108B (FIG. 1) may receive a data response from the insurance application that may include insurance premium information, such as a warning not to go above a certain threshold or insurance premium may increase. Furthermore, the data transfer reduction program 108A, 108B (FIG. 1) may receive a data response from the weather distribution application that may include weather information based on the location of the automobile. Therefore, the data transfer reduction program 108A, 108B (FIG. 1) may receive the insurance premium information and the weather information on the edge gateway 208 (FIG. 2) that may in turn process and transmit the information to the devices 202 (FIG. 2), such as by displaying the weather on the navigation device 202 (FIG. 2).

It may be appreciated that FIGS. 2 and 3 provide only illustrations of one implementation and do not imply any limitations with regard to how different embodiments may be implemented. Many modifications to the depicted environments may be made based on design and implementation requirements. For example, the data transfer reduction program 108A, 108B (FIG. 1) may register lists of applications 214 (FIG. 2) on the edge gateway 208 (FIG. 2) based on collected data and may store application information on a gateway database 226 (FIG. 2). Therefore, at step 306 (FIG. 3), the data transfer reduction program 108A, 108B (FIG. 1) may identify destination applications 214 (FIG. 2) for receiving the collected data 222 (FIG. 2) by populating lists of destination applications 214 (FIG. 2) registered with the edge gateway 208 (FIG. 2).

Furthermore, the data transfer reduction program 108A, 108B (FIG. 1) may use the edge gateway 208 (FIG. 2) to divide the collected data 222 (FIG. 2) into data to be disclosed to the public without permission and data requiring permission to be disclosed to the public. Specifically, the data transfer reduction program 108A, 108B (FIG. 1) may determine whether destination applications 214 (FIG. 2) require data to be disclosed to the public without permission and may use the edge gateway 208 (FIG. 2) to communicate with the destination applications 214 (FIG. 2) and divide the collected data 222 (FIG. 2) based on the determination.

Figure 4:
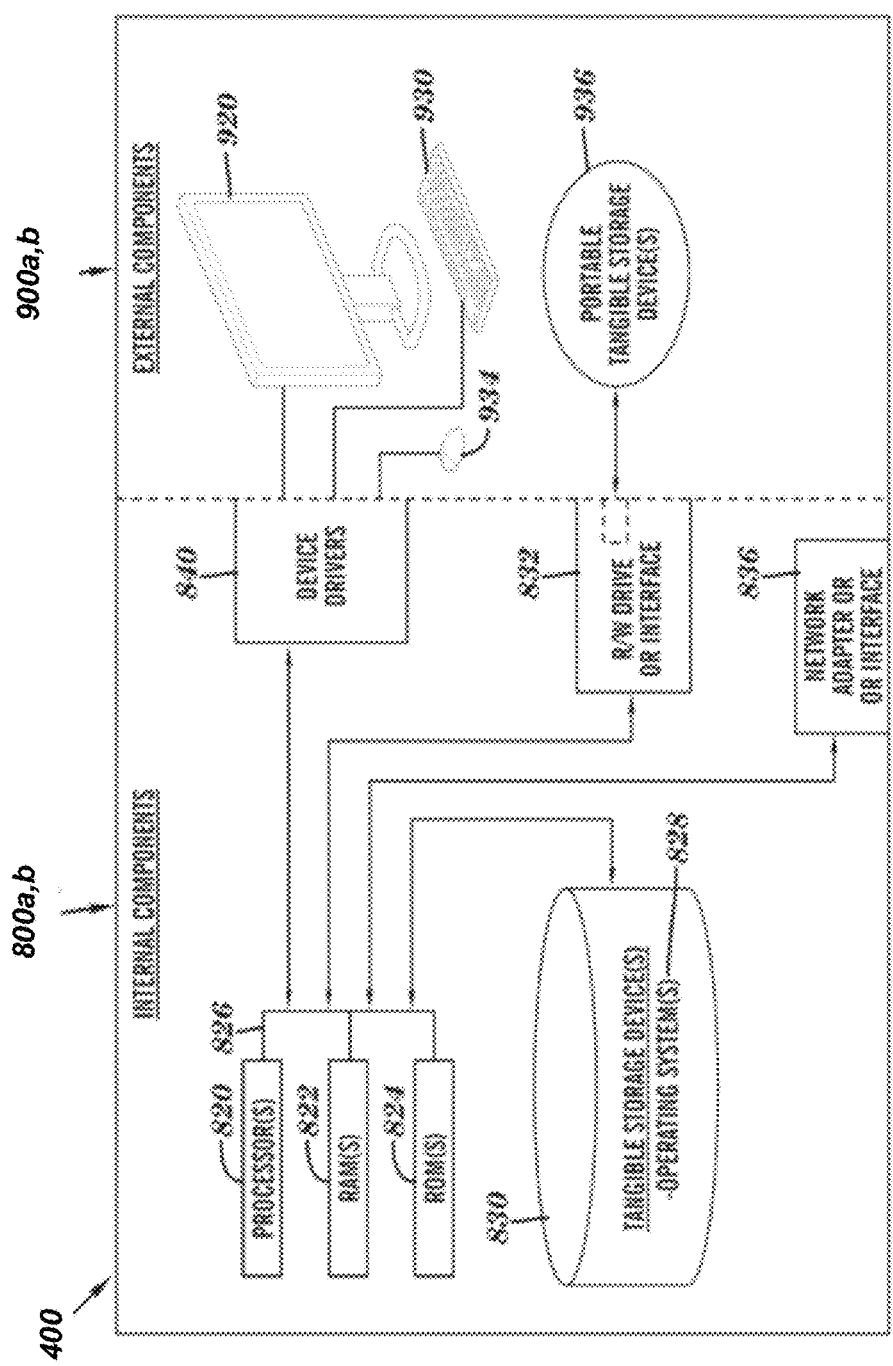
FIG. 4 is a block diagram of the system architecture of a program for reducing data transfer connections associated with devices and applications according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User computing device 102 (FIG. 1), and network server 112 (FIG. 1) include respective sets of internal components 800 *a*, *b* and external components 900 *a*, *b* illustrated in FIG. 4. Each of the sets of internal components 800 *a*, *b* includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the data transfer reduction program 108A (FIG. 1) in computing device 102 (FIG. 1), and the data transfer reduction program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, or any other computer-readable tangible storage device that can store a computer program and digital information.

Each set of internal components 800 *a*, *b*, also includes a R/W drive or interface 832 to read from and write to one or more portable computer-readable tangible storage devices 936 such as a CD-ROM, DVD, memory stick, magnetic tape, magnetic disk, optical disk, or semiconductor storage device. A software program, such as a data transfer reduction program 108A and 108B (FIG. 1), can be stored on one or more of the respective portable computer-readable tangible storage devices 936, read via the respective R/W drive or interface 832, and loaded into the respective hard drive 830.

Each set of internal components 800 *a*, *b* also includes network adapters or interfaces 836 such as a TCP/IP adapter cards, wireless Wi-Fi interface cards, or 3G or 4G wireless interface cards or other wired or wireless communication links. The data transfer reduction program 108A (FIG. 1) and software program 114 (FIG. 1) in computing device 102 (FIG. 1), and the data transfer reduction program 108B (FIG. 1) in network server 112 (FIG. 1) can be downloaded to computing device 102 (FIG. 1) from an external computer via a network (for example, the Internet, a local area network or other, wide area network) and respective network adapters or interfaces 836. From the network adapters or interfaces 836, the data transfer reduction program 108A (FIG. 1) and software program 114 (FIG. 1) in computing device 102 (FIG. 1) and the data transfer reduction program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900 *a*, *b* can include a computer display monitor 920, a keyboard 930, and a computer mouse 934. External components 900 *a*, *b* can also include touch screens, virtual keyboards, touch pads, pointing devices, and other human interface devices. Each of the sets of internal components 800 *a*, *b* also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
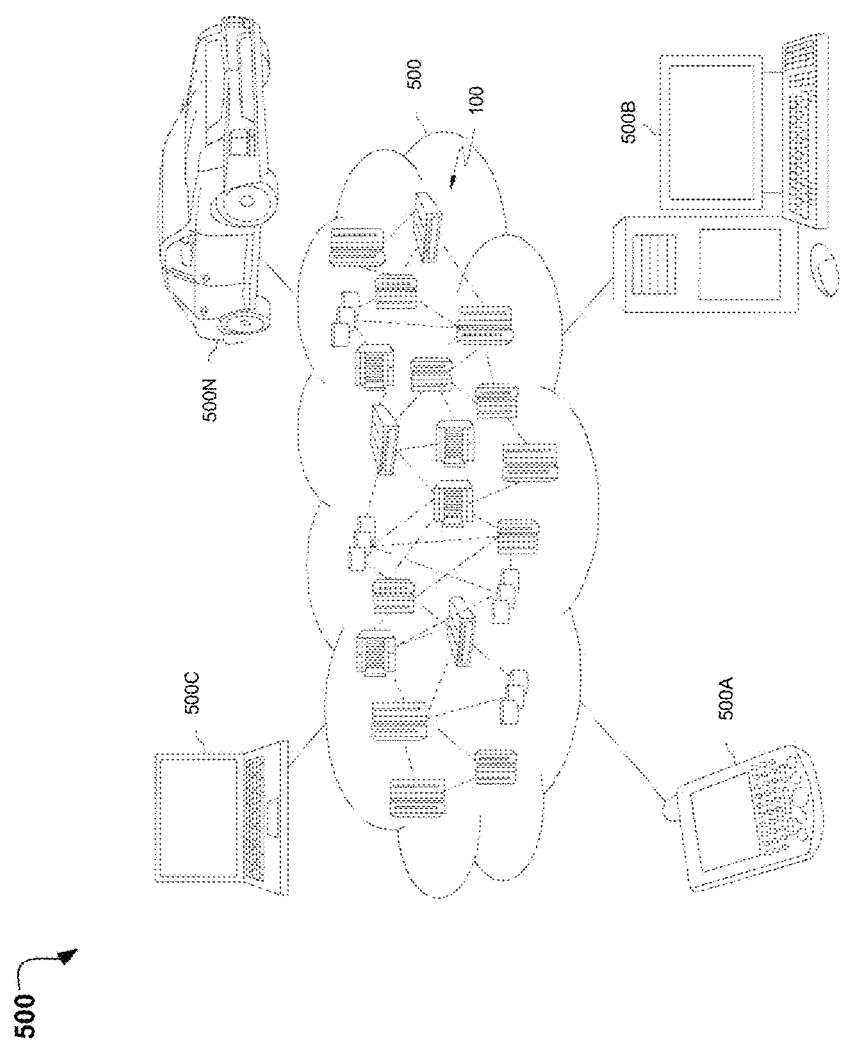
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
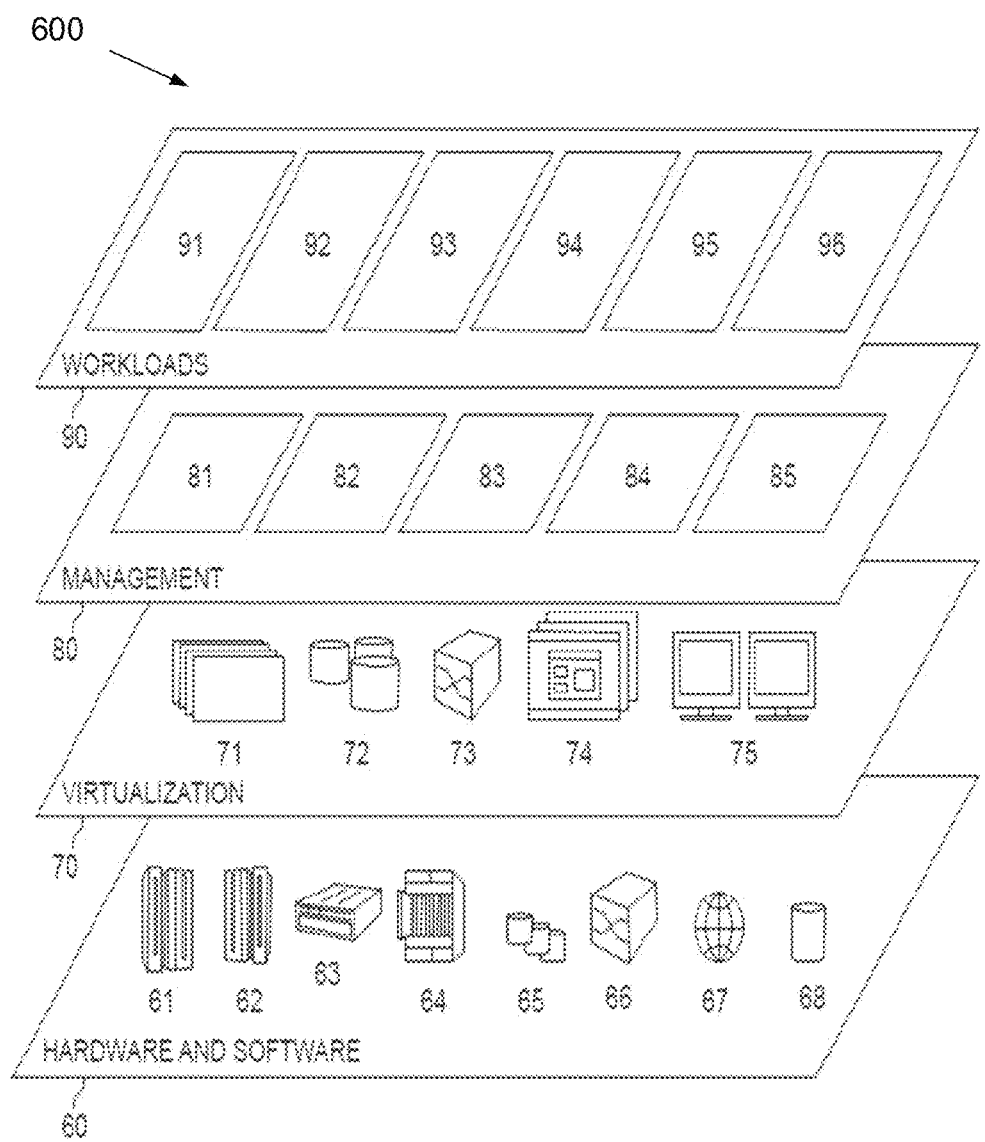
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data transfer reduction 96. A data transfer reduction program 108A, 108B (FIG. 1) may be offered "as a service in the cloud" (i.e., Software as a Service (SaaS)) for applications running on mobile devices 102 (FIG. 1) and may reduce data transfer connections associated with devices and applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing a plurality of data transfer connections associated with a plurality of devices and a plurality of applications, the method comprising:
   receiving, by one or more hardware processors, a plurality of data requests associated with the plurality of devices;
   collecting, using the one or more hardware processors and an edge gateway, a plurality of data associated with the plurality of devices based on the received plurality of data requests;
   identifying, by the one or more hardware processors, the plurality of applications for receiving the collected plurality of data based on the received plurality of data requests, and registering the plurality of applications on the edge gateway;
   separating, by the one or more hardware processors, the received plurality of data requests into one or more parts, and determining at least one commonality between the one or more parts of the received plurality of data requests, wherein the commonality is based on the one or more parts comprising identical data requests for data associated with the collected plurality of data, and combining one or more of the received plurality of data requests based on the one or more parts of the received plurality of data requests comprising identical data requests;
   generating, by the one or more hardware processors, a plurality of datasets based on the collected plurality of data and the identified plurality of applications, wherein each generated dataset associated with the generated plurality of datasets includes data associated with the collected plurality of data that is combined based on the determined at least one commonality for transmission to the plurality of applications;
   generating, by the one or more hardware processors, at least one password for each of the generated datasets, wherein the generated at least one password includes an expiration date;
   encrypting, by the one or more hardware processors, the generated at least one password for each of the generated datasets;
   generating, by the one or more hardware processors, a plurality of data blocks, wherein each generated data block associated with the generated plurality of data blocks includes a dataset associated with the generated plurality of datasets, the generated and encrypted at least one password for the dataset, and a universally unique identifier (UUID) for each application associated with the identified plurality of applications;
   transmitting, by the one or more hardware processors, the generated plurality of data blocks to the identified plurality of applications, wherein the generated plurality of data blocks include at least one timestamp and at least one digital certificate; and
   receiving and transmitting, by the one or more hardware processors, a plurality of data responses from the identified plurality of applications based on the transmitted plurality of data blocks.

2. The method of claim 1, wherein the plurality of devices includes at least one internet of things (IoT) device.

3. The method of claim 1, wherein identifying the plurality of applications for receiving the collected plurality of data further comprises:
   populating a list of the registered plurality of applications.

4. The method of claim 1, wherein the generated at least one password is encrypted using one or more public keys.

5. A computer system for reducing a plurality of data transfer connections associated with a plurality of devices and a plurality of applications, comprising:
   one or more hardware processors, one or more computer-readable memories, one or more computer-readable tangible storage devices, and program instructions stored on at least one of the one or more storage devices for execution by at least one of the one or more hardware processors via at least one of the one or more memories, wherein the computer system is configured to performing a method comprising:
   receiving a plurality of data requests associated with the plurality of devices;
   collecting, using an edge gateway, a plurality of data associated with the plurality of devices based on the received plurality of data requests;
   identifying the plurality of applications for receiving the collected plurality of data based on the received plurality of data requests, and registering the plurality of applications on the edge gateway;
   separating, by the one or more hardware processors, the received plurality of data requests into one or more parts, and determining at least one commonality between the one or more parts of the received plurality of data requests, wherein the commonality is based on the one or more parts comprising identical data requests for data associated with the collected plurality of data, and combining one or more of the received plurality of data requests based on the one or more parts of the received plurality of data requests comprising identical data requests;
   generating, by the one or more hardware processors, a plurality of datasets based on the collected plurality of data and the identified plurality of applications, wherein each generated dataset associated with the generated plurality of datasets includes data associated with the collected plurality of data that is combined based on the determined at least one commonality for transmission to the plurality of applications;

generating, by the one or more hardware processors, at least one password for each of the generated datasets, wherein the generated at least one password includes an expiration date;

encrypting, by the one or more hardware processors, the generated at least one password for each of the generated datasets;

generating, by the one or more hardware processors, a plurality of data blocks, wherein each generated data block associated with the generated plurality of data blocks includes a dataset associated with the generated plurality of datasets, the generated and encrypted at least one password for the dataset, and a universally unique identifier (UUID) for each application associated with the identified plurality of applications;

transmitting, by the one or more hardware processors, the generated plurality of data blocks to the identified plurality of applications, wherein the generated plurality of data blocks include at least one timestamp and at least one digital certificate; and receiving and transmitting, by the one or more hardware processors, a plurality of data responses from the identified plurality of applications based on the transmitted plurality of data blocks.

6. The computer system of claim 5, wherein the plurality of devices includes at least one internet of things (IoT) device.

7. The computer system of claim 5, wherein identifying the plurality of applications for receiving the collected plurality of data further comprises:

populating a list of the registered plurality of applications.

8. The computer system of claim 5, wherein the generated at least one password is encrypted using one or more public keys.

9. A non-transitory computer readable medium for reducing a plurality of data transfer connections associated with a plurality of devices and a plurality of applications, comprising:

one or more computer-readable storage devices and program instructions stored on at least one of the one or more computer-readable storage devices, the program instructions executable by one or more hardware processors, the non-transitory computer readable medium comprising:

program instructions to receive a plurality of data requests associated with the plurality of devices;

program instructions to collect, using an edge gateway, a plurality of data associated with the plurality of devices based on the received plurality of data requests;

program instructions to identify the plurality of applications for receiving the collected plurality of data based on the received plurality of data requests, and registering the plurality of applications on the edge gateway;

program instructions to separate the received plurality of data requests into one or more parts, and determining at least one commonality between the one or more parts of the received plurality of data requests, wherein the commonality is based on the one or more parts comprising identical data requests for data associated with the collected plurality of data, and combining one or more of the received plurality of data requests based on the one or more parts of the received plurality of data requests comprising identical data requests;

program instructions to generate a plurality of datasets based on the collected plurality of data and the identified plurality of applications, wherein each generated dataset associated with the generated plurality of datasets includes data associated with the collected plurality of data that is combined based on the determined at least one commonality for transmission to the plurality of applications;

program instructions to generate at least one password for each of the generated datasets, wherein the generated at least one password includes an expiration date;

program instructions to encrypt the generated at least one password for each of the generated datasets;

program instructions to generate a plurality of data blocks, wherein each generated data block associated with the generated plurality of data blocks includes a dataset associated with the generated plurality of datasets, the generated and encrypted at least one password for the dataset, and a universally unique identifier (UUID) for each application associated with the identified plurality of applications;

program instructions to transmit the generated plurality of data blocks to the identified plurality of applications, wherein the generated plurality of data blocks include at least one timestamp and at least one digital certificate; and program instructions to receive and transmit a plurality of data responses from the identified plurality of applications based on the transmitted plurality of data blocks.

10. The non-transitory computer readable medium of claim 9, wherein the program instructions to identify the plurality of applications for receiving the collected plurality of data further comprises:

program instructions to populate a list of the registered plurality of applications.

11. The non-transitory computer readable medium of claim 9, wherein the generated at least one password is encrypted using one or more public keys.

* * * * *